(12) United States Patent
Sankaran et al.

(10) Patent No.: US 7,945,555 B2
(45) Date of Patent: May 17, 2011

(54) METHOD FOR CATEGORIZING CONTENT PUBLISHED ON INTERNET

(75) Inventors: Ayyappan Sankaran, San Jose, CA (US); Jayant Kadambi, Mountain view, CA (US); Matthew D Shaver, Fremont, CA (US)

(73) Assignee: Yume, Inc., Redwood City, CA (US)

( * ) Notice: Subject to any disclaimer, the term of this patent is extended or adjusted under 35 U.S.C. 154(b) by 490 days.

(21) Appl. No.: 11/964,711

(22) Filed: Dec. 27, 2007

(65) Prior Publication Data

US 2008/0189307 A1    Aug. 7, 2008

Related U.S. Application Data

(60) Provisional application No. 60/887,622, filed on Feb. 1, 2007.

(51) Int. Cl.
*G06F 7/20* (2006.01)
*G06F 17/30* (2006.01)
*G06Q 30/00* (2006.01)

(52) U.S. Cl. ........ 707/710; 707/739; 707/740; 707/748; 705/10; 705/14.52

(58) Field of Classification Search ................. 707/100, 707/999.1, 710, 739, 740, 748; 705/10, 14, 705/14.52
See application file for complete search history.

(56) References Cited

U.S. PATENT DOCUMENTS

| | | | | |
|---|---|---|---|---|
| 6,459,809 B1 * | 10/2002 | Jensen et al. | | 382/203 |
| 2004/0199497 A1 * | 10/2004 | Timmons | | 707/3 |
| 2008/0147788 A1 * | 6/2008 | Omoigui | | 709/203 |
| 2010/0070448 A1 * | 3/2010 | Omoigui | | 706/47 |

* cited by examiner

*Primary Examiner* — James Trujillo
*Assistant Examiner* — Bruce M Moser
(74) *Attorney, Agent, or Firm* — Lau & Associates, LLC (57) ABSTRACT

The present invention provides method and system for categorizing a content published on Internet. The method comprising gathering one or more feeds associated with the content. The method further comprises extracting contextual information from the one or more feeds. Thereafter, the content is categorized into one or more general web-based categories belonging to a set of general web-based categories. The categorizing step further comprises performing a semantic analysis of the contextual information that yields a keyword string. The content is classified into the one or more general web-based category based on the keyword string. Finally, the set of general web-based categories is translated to a set of pre-defined categories, such that one or more general web-based category is translated to a pre-defined category that is relevant to an end user.

17 Claims, 4 Drawing Sheets

METHOD FOR CATEGORIZING CONTENT PUBLISHED ON INTERNET

RELATED APPLICATIONS

Benefit is claimed under 35 U.S.C. 119(e) to U.S. Provisional Applications Ser. 60/887,622, entitled "Method for categorizing content on internet" by Ayyappan Sankaran et al., filed on 1 Feb. 2007 which is herein incorporated in its entirety by reference for all purposes.

FIELD OF THE INVENTION

The present invention relates generally to categorizing content on Internet. More specifically, the present invention relates to a method and system for categorizing content on Internet that may be useful for a particular task.

BACKGROUND OF THE INVENTION

Generally, content on Internet provided by content providers is available in uncategorized form. Since such a huge amount of content is available in uncategorized form, it may make it difficult to search for relevant content. Searching for relevant content is crucial for certain specific tasks. For example, advertisers need to select content with which they want to place their advertisements. The advertisements of a company project the company's brand to customers. This is especially important for the video advertisements as the brand of a company is projected much more prominently to the customers with video advertisements as compared to textual advertisements. In order to protect and promote their brand, the companies may like to search for content which is relevant to the advertisements they want to place on Internet.

There have been some attempts to provide a system for categorizing content on Internet into general web-based categories. The general web-based categories may include but are not limited to, Open Directory (dmoz) categories, Yahoo directories etc. The general web-based categories provide a multi-level hierarchical category system. The categories and the multi-level hierarchy provided by general web-based categories may not be useful for specific tasks. For example, advertisers may like to have a TV-like content channels category system to help them know on which Internet "channel" their advertisements are being placed. Such Internet "channels" may be more useful to the advertisers if each channel covers a broad range of content categories. The advertisers and the content providers of the content may also like to know the Internet "channels" which are popular.

Therefore, there is a need for a method and system to categorize content on Internet into a set of pre-defined categories that may be useful for a particular task. Further, there is a need for method that provides a measure of content in the set of pre-defined categories and the demographic data related to the set of pre-defined categories.

SUMMARY OF THE INVENTION

Various embodiments of the present invention provide method and system for categorizing content on Internet.

The method includes gathering one or more feeds associated with a content published on Internet. The method further includes extracting contextual information from the one or more feeds. Thereafter, the content is categorized into one or more of general web-based categories belonging to a set of general web-based categories. The categorizing step further includes performing a semantic analysis of the contextual information that yields a keyword string. The content is then classified into the one or more general web-based categories based on the keyword string. Finally, the set of general web-based categories is translated to a set of pre-defined categories. Thus, the one or more general web-based category is translated to one or more pre-defined categories.

An embodiment of the present invention provides method and system for associating a first relevance percentage with the content in each of the one or more general web-based categories. The first relevance percentage gives an indication of the relevance of the content to the one or more general web-based categories. Further, a second relevance percentage is associated with the content in each of the at least one pre-defined categories. The second relevance percentage gives an indication of the relevance of the content to the one or more pre-defined categories. Further, the system may calculate the amount of data in each pre-defined category of the set of pre-defined categories. The amount of data in each pre-defined category gives an indication of popularity of the pre-defined category.

BRIEF DESCRIPTION OF THE DRAWINGS

The foregoing objects and advantages of the present invention method for categorizing content on Internet may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Before describing in detail embodiments that are in accordance with the present invention, it should be observed that the embodiments reside primarily in combinations of method steps and system components for categorizing content on Internet. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Relative terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

Various embodiments of the present invention provide method and system for categorizing content on Internet into a set of pre-defined categories. In accordance with the present invention, feeds corresponding to content published on Internet are used to categorize the content. Specifically, the feeds that are either user generated or professionally generated or both are used to categorize the content into a set of general web-based categories. The set of general web-based categories are the conventional categories used for categorizing content published on Internet. The general web-based categories may include, but are not limited to, Open Directory (dmoz) categories, Yahoo directories etc. This set of general web-based categories is translated to the set of pre-defined categories. The set of pre-defined categories includes categories which are more relevant to an end user.

Figure 1:
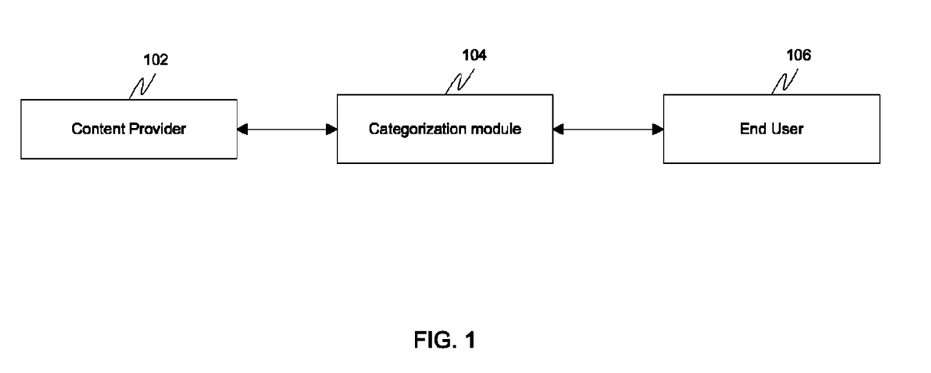
FIG. 1 illustrates a block diagram of an exemplary environment where various embodiments of the present invention can function.

Referring now to the drawings and in particular to FIG. 1, a block diagram of an exemplary environment where various embodiments of the present invention can function in, is explained. Internet includes a plurality of content and a content provider 102 may publish a content on Internet. Further, content provider 102 may provide one or more feeds corresponding to the content. The one or more feeds may be HTTP or web based feeds using RSS (Really Simple Syndication) 2.0 or ATOM 1.0 formats. Content Provider 102 can be a publisher or a content aggregator. Those skilled in the art will appreciate that the one or more feeds may be provided by a plurality of content providers including content viewers and professional publishers.

A categorization module 104 obtains the one or more feeds from content provider 102. Categorization module 104 may obtain the one or more feeds from content provider 102 by periodically polling Content provider's website for feed files. Alternatively, categorization module 104 may receive the one or more feeds automatically from content provider 102, when content provider 102 generates the one or more feeds. Categorization module 104 categorizes the content into one or more general web-based categories based on feed files. For instance, the content may be categorized using title information or content metadata embedded into the feed files. The one or more general web-based categories belong to a set of general web-based categories. The set of general web-based categories may include conventional categories such as, but it is not limited to, Open Directory (dmoz) categories or Yahoo directories. Further, categorization module 104 may also provide a first relevance percentage for the content being categorized into the one or more general web-based categories. The first relevance percentage represents relevance of the content to the one or more general web-based categories. The first relevance percentage of content may be calculated based on frequency counts of certain terms in the content, where the certain terms may be obtained from the name of a general web-based category. Further, categorization module 104 may also provide information regarding the amount of data in each general web-based category. The amount of data in a general web-based category gives an indication of popularity of the general web-based category.

Categorization module 104 further translates the set of general web-based categories into a set of pre-defined categories. The translation is done such that one or more general web-based categories are translated (or mapped) to a pre-defined category. Thus, a pre-defined category includes one or more content from the one or more general web-based categories. Thus, the content is, in effect, categorized into one or more pre-defined categories. Further, categorization module 104 may also provide a second relevance percentage of the content being categorized into the one or more pre-defined category. The second relevance percentage represents relevance of the content to a pre-defined category. The second relevance percentage of content may be calculated based on frequency counts of certain terms in the content, where the certain terms may be obtained from the name of a pre-defined category. Categorization module 104 may also provide information regarding the amount of data in each pre-defined category. The amount of data in a pre-defined category gives an indication of popularity of the pre-defined category.

An end user 106 may obtain information about the set of pre-defined categories from categorization module 104. Further, end user 106 may obtain information regarding the second relevance percentage and the amount of data in each pre-defined category in the set of pre-defined categories. End user 106 may be a content provider or an advertiser. End user 106 may use the information regarding the second relevance percentage and the amount of data in each pre-defined category for his specific purpose. For example, an advertiser may identify popular pre-defined categories by comparing the amount of data in different pre-defined categories and place his advertisements with content in a popular pre-defined categories. Further, advertisers may want to place advertisement with specific type of content. The advertisers may determine the type of content with which an advertisement is to be placed based on the pre-defined categories. The pre-defined categories may be compared to TV channel-like content category system. The pre-defined categories may further include sub-categories. The sub-categories of the pre-defined categories may be compared to TV shows. An advertiser may be given an indication of the type of content in each TV channel-like per-defined category. The advertiser may then get further information regarding the data in each TV show-like sub-category of the pre-defined category. On the other hand, based on the pre-defined category that the content is categorized in, a content provider may judge the popularity of his content and determine the advertising cost accordingly.

Figure 2:
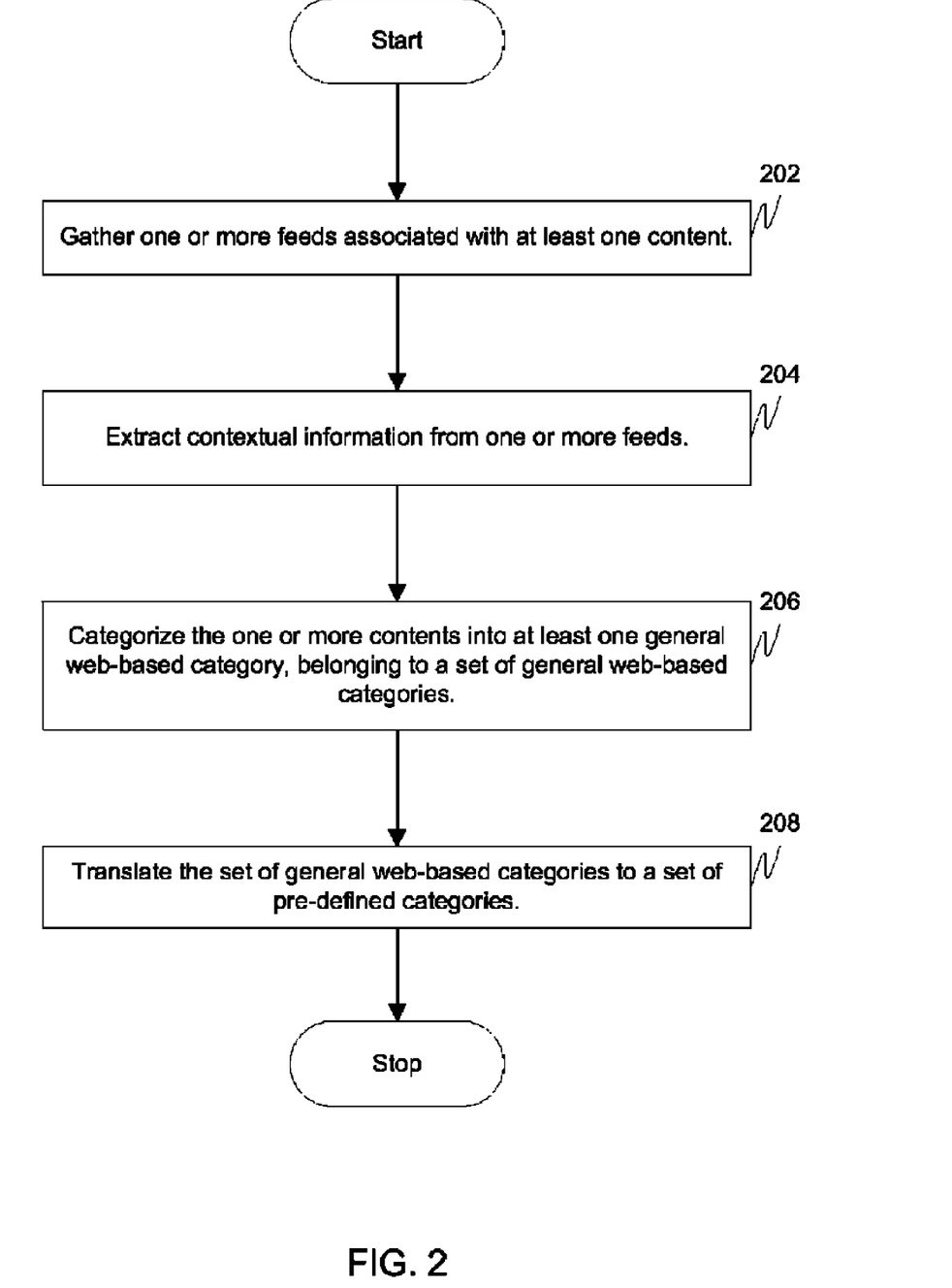
FIG. 2 illustrates a flow diagram of a method for categorizing a content published on Internet, in accordance with an embodiment of the present invention.

FIG. 2 illustrates a flow diagram of a method for categorizing a content published on Internet, in accordance with an embodiment of the present invention. One or more feeds associated with the content provided by content Provider 102 of FIG. 1 are gathered at step 202. Content Provider 102 may also insert a unique content ID corresponding to the content into the one or more feeds. The unique content ID may be used by end user 106 to identify sources of the content. In an embodiment, content provider 102 of FIG. 1 may be constantly polled for new feeds corresponding to the content.

Thereafter, a contextual information is extracted from the one or more feeds at step 204. The contextual information may include, but not limited to, metadata and title information embedded into the one or more feeds. Categorization module 104 may be configured to extract the contextual information from the one or more feeds. In an embodiment of the present invention, the contextual information may be provided by content provider 102 in the form of content tags and content catalogue information. At step 206, the contextual information is used by categorization module 104 to categorize the content into one or more general web-based categories. The categorization step, step 206, is explained in detail in conjunction with FIG. 3.

It will be appreciated by those skilled in the art that the set of general web-based categories can be very general and may not be useful for specific purposes. Thus, categorization module 104 translates the set of general web-based categories to a set of pre-defined categories at step 208. Thus, the content, which is categorized into the one or more general web-based categories, is effectively categorized into one or more pre-defined category of the set of pre-defined categories. The information regarding the content and the set of general web-based categories in each pre-defined category of the set of pre-defined categories may be stored in a database.

Additionally, a general web-based category and a pre-defined category may be represented as a string; for example, "autos", "computers", "furniture" etc. A sub-category of a general web-based category or a pre-defined category may be represented by appending a sub-category name with the general web-based category's or the pre-defined category's name, where the sub-category name is separated from the parent category by a separator. For example, the category "autos" may have a first sub-category "domestic" and a second sub-category "foreign". A back slash '/' may be used as a separator. Therefore, the first sub-category will be represented as "autos/domestic" and the second sub-category will be represented as "autos/foreign".

Further, the set of general web-based categories may be translated to the set of pre-defined categories. Patterns in strings used to represent the general web-based categories may be used to check for translation matches with the pre-defined categories. The translation from the general web-based categories to the pre-defined categories requires a set of associations. For instance, a general web-based category and each of its subcategories may be associated with a pre-defined category in the new set of pre-defined categories. A general web-based category, such as "top/arts/entertainment", may be associated with a pre-defined category, such as "entertainment". This implies that subcategories of the general web-based category "top/arts/entertainment", which may include "top/arts/entertainment/reviews", "top/arts/entertainment/reviews/dvds" etc., may also be associated with the pre-defined category "entertainment".

Generally, the set of general web-based categories is represented using a first hierarchical structure with many levels, for example a general web-based category "Top/arts/entertainment" has three levels. On the other hand, the set of predefined categories have a second hierarchical structure with at most a predetermined number of levels, for example a pre-defined category "Entertainment" has one level or may have at most two levels, such as "arts/entertainment". Thus, one or more general web-based categories may be mapped or translated to a single pre-defined category, which is more relevant to End user 106. For instance, a general web-based category "Top/Arts/Entertainment" and "Top/Shopping/Entertainment" can be translated to a predetermined category "Entertainment". Moreover, sub-categories of a general web-based category may be translated to a same pre-defined category. For instance, a general web-based category "Top/Arts/Entertainment" and its sub-category "Top/Arts/Entertainment/Reviews" may be translated to the pre-defined category "Entertainment".

Furthermore, the order in which associations are established may also be important. For example, a general web-based category "top/arts/entertainment" may be associated with a pre-defined category "Entertainment". This associate may be called a first association. However, the general web-based category "top/arts/entertainment" may have a sub-category "top/arts/entertainment/online_media/search_engines" which may be associated with a pre-defined category "entertainment". This association may be called a second association. In order to establish proper associations, the second association has to be performed before the first association.

Further, in an embodiment, the content may be categorized into one or more pre-defined categories based on a safety relevance. The safety relevance corresponds to a rating for content on Internet. For instance, the content can be given a safety rating like motion picture rating system in the United States, G (General Audiences—All ages admitted), PG (Parental Guidance Suggested), PG-13 (Parents Strongly Cautioned—Some material may be inappropriate for children under 13), R (Restricted—Persons under 16 are not admitted unless accompanied by parent or adult guardian), X (strong adult content—Persons under 17 not admitted). The safety rating may follow any other rating system, for example, a labeling system proposed and used by Internet Content Rating Association.

Those skilled in the art will appreciate that the process of translation of the set of general web-based categories to the set of pre-defined categories may be automated. In case a translation for one or more general web-based categories is not found, manual classification may be carried out in one embodiment of the present invention. In another embodiment of the present invention, any general web-based categories, for which there is no association, can be translated into a pre-defined category called "miscellaneous". The general web-based categories, which are in the "miscellaneous" pre-defined category, can be periodically reviewed to decide if a new pre-defined category can be formed.

The general web-based categories include of a multiple-level hierarchy. End user 106 may not require such a multiple-level hierarchy. The set of pre-defined categories, with the predetermined number of levels, provides End user 106 with a categorization of the content published on Internet which is relevant for End user 106. Further, End user 106 may be provided with an option to decide the level of hierarchy desired by them in the set of pre-defined categories. The associations of the set of general web-based categories with the set of pre-defined categories may be established based on the desired level of hierarchy.

After the associations are established between the set of general web-based categories and the set of pre-defined categories, the amount of data in each pre-defined categories may also be determined by categorization module 104. The amount of data in the general web-based categories may be used to calculate the amount of data in the pre-defined categories. For example, if two general web-based categories are combined together to form a single pre-defined category, then the amount of data in the single pre-defined category is calculated by adding the amount of data in the two general web-based categories. The amount of data in each general web-based category and/or pre-defined category may be updated as and when content is obtained from content providers.

Figure 3:
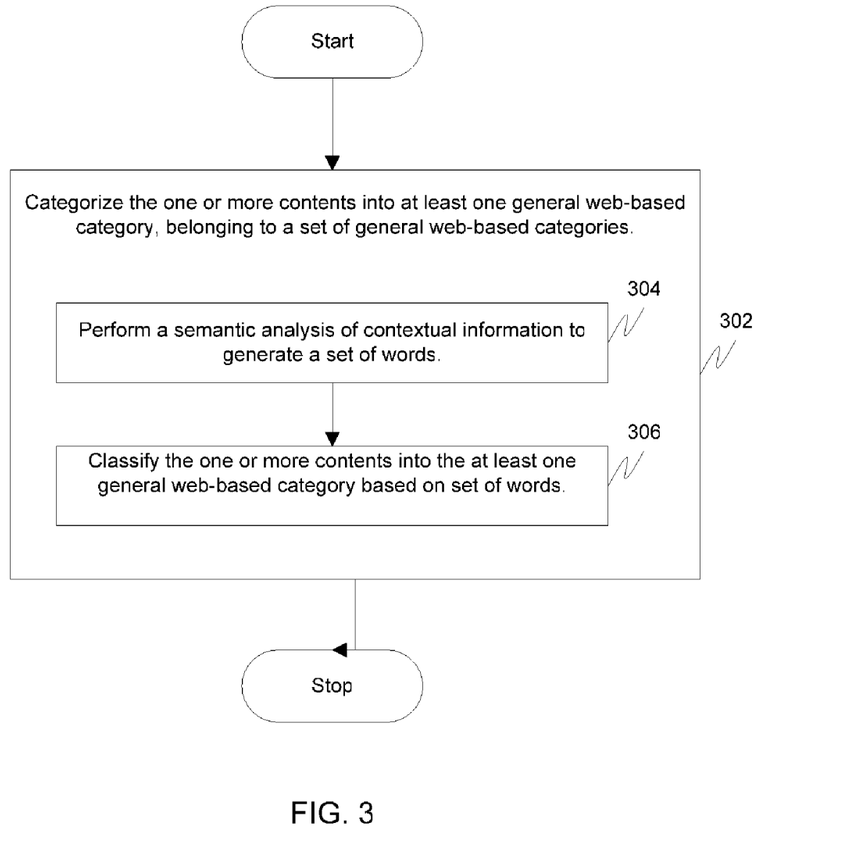
FIG. 3 illustrates a flow diagram of a method for performing the categorizing step of FIG. 2.

FIG. 3 illustrates a flow diagram of a method for performing the categorizing step, step 206 of FIG. 2, in accordance with an embodiment of the present invention. The categorizing step 206 of FIG. 2 is depicted as step 302 in FIG. 3. As mentioned earlier, in conjunction with FIG. 2, one or more feeds corresponding to a content published on Internet are gathered, step 202, and contextual information is extracted from the one or more feeds, step 204. Further, at step 304, semantic analysis is performed on the contextual information. The semantic analysis generates a keyword string corresponding to the contextual information. The semantic analysis may include latent semantic indexing to generate the keyword string. The latent semantic indexing technique is generally used to retrieve and record a keyword string in a document. The keyword string thus retrieved is used to examine a document collection to find other documents that includes a similar keyword string. The latent semantic indexing technique assumes that documents that share a keyword string are semantically related.

A first relevance percentage for the content may be calculated based on the keyword string. For example, a keyword string retrieved from a content may be "Insight" and "Honda". The keyword string is matched with the names or description of the general web-based categories. Based on the matching, the first relevance percentage is calculated. The first relevance percentage for the keywords "Insight" and "Honda" thus calculated may be 56.3% for a category "Recreation/Autos/Makes_and_Models/Honda/Insight", 36.6% for a category "Recreation/Autos/Makes_and_Models/Honda", 4.6% for "Recreation/Autos/Makes_and_Models" and 2.5% for other categories.

Thereafter, the content corresponding to the one or more feeds is classified into one or more general web-based categories at step 306. The content may be classified based on the first relevance percentage of classifying the content in a particular general web-based category. The one or more general web-based categories belong to a set of general web-based categories, which are conventional and known in the art. Further, the set of general web-based categories are translated to a set of pre-defined categories, as mentioned in conjunction with FIG. 2. The set of general web-based categories may be translated to the set of pre-defined categories based on a second relevance percentage. The second relevance percentage may give a measure of how relevant a general web-based category is to a particular pre-defined category. The second relevance percentage may be calculated using a similar method as used for calculating the first relevance percentage.

Figure 4:
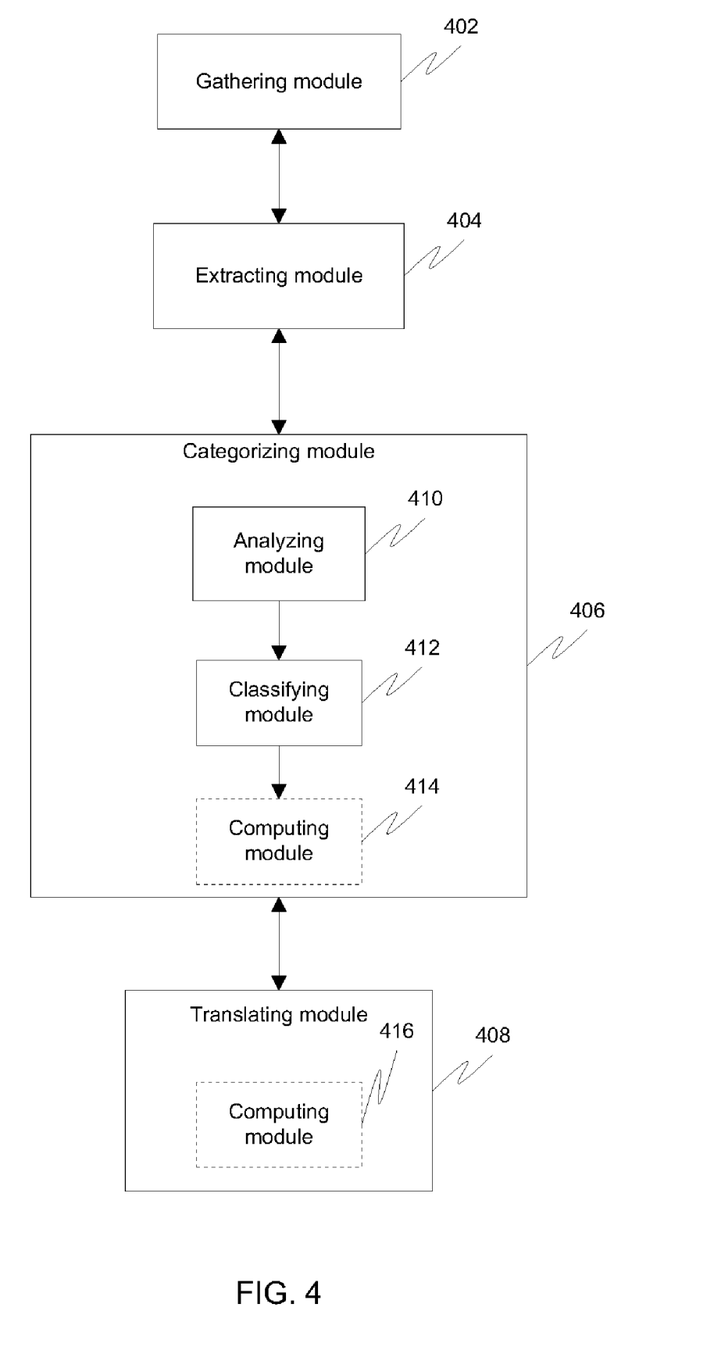
FIG. 4 illustrates a block diagram of a system for categorizing a content on published Internet, in accordance with an embodiment of the present invention.

FIG. 4 illustrates a block diagram of a system for categorizing a content published on Internet, in accordance with an embodiment of the present invention. The system includes a gathering module 402, an extracting module 404, a categorizing module 406 and a translating module 408. One or more content providers may publish one or more content on Internet. The one or more content providers may further associate one or more feeds with the one or more content. As mentioned before, the one or more feeds can be http or web feeds using RSS or ATOM. Further, feeds corresponding to the one or more content can also be provided by content viewers or professional publishers. Gathering module 402 gathers the one or more feeds associated with a content published on Internet. Gathering module 402 may gather feeds associated with the content on a periodic basis so as to keep the content updated.

Thereafter, extracting module 404 extracts a contextual information from the one or more feeds. As mentioned before, the contextual information may also be provided by the content provider in the form of content tags and content catalogue information. Further, the content provider may also provide a unique content ID corresponding to the content. Based on the contextual information, categorizing module 406 categorizes the content into one or more general web-based categories. As mentioned earlier, the one or more general web-based categories belong to a set of general web-based categories.

Categorizing module 406 further includes an analyzing module 410, a classifying module 412 and a computing module 414. Analyzing module 410 performs semantic analysis on the contextual information and generates a keyword string using the contextual information. As mentioned before, the semantic analysis may include algorithms such as a latent semantic indexing to generate the keyword string. Classifying module 412, then, classifies the content into the one or more general web-based categories. Thereafter, computing module 414 may compute a first relevance percentage corresponding to the content classified into each of the one or more general web-based categories. The first relevance percentage may be calculated based on frequency counts of certain terms in the content, where the certain terms may be obtained from the name of a general web-based category. Further, computing module 414 may also provide information regarding the amount of data in each general web-based category in the set of general web-based categories. The amount of data in a general web-based category gives an indication of popularity of the general web-based category.

Further, translating module 408 translates the set of general web-based categories to a set of pre-defined categories. As mentioned earlier, one or more general web-based category may be classified to a pre-defined category such that the pre-defined category is more relevant to the end user. Thus, the content which is classified into the one or more general web-based category is effective categorized into one or more pre-defined category. Translating module 408 can further include a computing module 416. Computing module 416 computes a second relevance percentage corresponding to the content classified into each of the one or more pre-defined categories. The second relevance percentage of the content may be calculated based on frequency counts of certain terms in the content, where the certain terms may be obtained from the name of a pre-defined category. Further, computing module 416 may also provide information regarding the amount of data in each pre-defined category of the one or more pre-defined categories. The amount of data in a pre-defined category gives an indication of popularity of the pre-defined category. As mentioned before, the set of general web-based categories is represented using a first hierarchical structure with many levels, for example a general web-based category "Top/arts/entertainment" has three levels. On the other hand, the set of predefined categories have a second hierarchical structure with at most a predetermined number of levels, for example a pre-defined category "Entertainment" has one level or may have at most two levels, such as "arts/entertainment". Thus, one or more general web-based categories may be mapped or translated to a single pre-defined category, which is more relevant to the end user.

It will be appreciated by those skilled in the art that the content may be categorized into the set of pre-defined categories for applications such as, but not limited to, advertising, searching relevant content, providing the end user and content provider with essential statistics etc. The content provider may use the essential statistics to improve the contextual information. Further, the content provider may also use the essential statistics to determined cost of advertising, based one, for instance, time slot for advertising, the page number on which an advertisement is placed, the content with which the advertisement is placed, etc.

The method for categorizing the content published on Internet, as described in the present invention or in any of its embodiments, may be realized in the form of a computing device. The computing device can be, but not limited to, a general-purpose computer, a programmed microprocessor, a micro-controller, a peripheral integrated circuit element, and other devices or arrangements of devices, which are capable of implementing the steps that constitute the method of the present invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

Various embodiments of the present invention provide methods and systems for categorizing content published on Internet into a set of pre-defined categories. The system gathers feeds corresponding to the content published on Internet and categorizes the content into a set of general web-based categories. Therefore, the categorization of the content is kept up to date. Thereafter, the set of general web-based categories is translated to a set of pre-defined categorizes. The set of pre-defined categories may be selected such that it is more relevant for specific end user tasks. For example, the set of pre-defined categories may be selected such that it is more relevant to advertisers who need to select relevant content with which they want to place their advertisements. Thus, the content categorized into the pre-defined categories may be used by an end-user for various applications.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for categorizing at least one content on Internet, the method comprising:
gathering one or more feeds associated with the at least one content, wherein the at least one content is provided by at least one content provider; extracting contextual information from the one or more feeds, wherein the contextual information is embedded into the one or more feeds; categorizing the at least one content into at least one general web-based category, the at least one general web-based category belonging to a set of general web-based categories, the categorizing step comprising:
performing a semantic analysis of the contextual information,
wherein the semantic analysis of the contextual information yields a keyword string corresponding to the contextual information; and
classifying the at least one content into the at least one general web-based category based on the keyword string;
translating the set of general web-based categories to a set of pre-defined categories, wherein one or more general web-based categories from the set of general web-based categories are translated to at least one pre-defined category in the set of pre-defined categories, wherein the at least one content belongs to at least one pre-defined category when translating the set of general web-based categories to the set of pre-defined categories;
wherein the categorizing step further comprises computing a first relevance percentage corresponding to the at least one content classified into each of the at least one general web-based category.

2. The method of claim 1, wherein the translating step comprises determining a set of associations between the set of general web-based categories and the set of pre-defined categories, wherein an association from the set of associations maps a general web-based category and one or more sub-categories of the general web-based category with a pre-defined category, wherein the association is determined based on a relationship between a first string pattern and a second string pattern, wherein the first string pattern corresponds to the general web-based category and the one or more sub-categories of the general web-based category and the second string pattern corresponds to the pre-defined category.

3. The method of claim 1, wherein the translating step comprises computing a second relevance percentage corresponding to the at least one content belonging to each of the at least one pre-defined category.

4. The method of claim 1, wherein the translating step comprises a manual translation of one or more general web-based categories to one or more pre-defined categories when a translation of the one or more general web-based categories to each pre-defined category in the set of pre-defined categories is absent.

5. The method of claim 1, wherein the translating step comprises translating one or more general web-based categories to a miscellaneous category when a translation of the one or more general web-based categories to each pre-defined category in the set of pre-defined categories is absent, the miscellaneous category belonging to the set of pre-defined categories.

6. The method of claim 1, wherein the gathering step comprises at least one of polling the at least one content provider for at least one new feed and automatically receiving the at least one new feed from the at least one content provider.

7. The method of claim 1, wherein the set of general web-based categories is represented using a first hierarchical structure and the set of pre-defined categories is represented using a second hierarchical structure, the second hierarchical structure comprising at most a predetermined number of levels.

8. The method of claim 1, wherein a general web-based categorizing engine categorizes the at least one content into at least one general web-based category.

9. The method of claim 1, wherein the one or more feeds are obtained in at least one of a RSS 2.0 format and an ATOM 1.0 format.

10. The method of claim 1, wherein the contextual information is at least one of a content tag and a content catalogue information corresponding to the at least one content.

11. The method of claim 1, wherein the set of general web-based categories is at least one of a set of Open Directory (dmoz) categories and a set of Yahoo directory categories.

12. A computing system for categorizing at least one content on Internet, the computing system comprising: a processor implemented gathering module, the processor implemented gathering module gathering one or more feeds associated with the at least one content, the at least one content provided by at least one content provider;
   a processor implemented extracting module, the processor implemented extracting module extracting contextual information from the one or more feeds, wherein the contextual information is embedded into the one or more feeds;
   a processor implemented categorizing module, the processor implemented categorizing module categorizing the at least one content into at least one general web-based category, the at least one general web-based category belonging to a set of general web-based categories, the processor implemented categorizing module comprising:
   a processor implemented analyzing module, the processor implemented analyzing module performing a semantic analysis of the contextual information, wherein the semantic analysis of the contextual information yields a keyword string corresponding to the contextual information; and
   a processor implemented classifying module, the processor implemented classifying module classifying the at least one content into the at least one general web-based category based on the keyword string; and
   a processor implemented translating module, the processor implemented translating module translating the set of general web-based categories to a set of pre-defined categories, wherein one or more general web-based categories from the set of general web-based categories are translated to at least one pre-defined category in the set of pre-defined categories, wherein the at least one content belongs to at least one pre-defined category when translating the set of general web-based categories to the set of pre-defined categories; and
   wherein the categorizing module further comprises a first computing module, the first computing module computing a first relevance percentage corresponding to the at least one content classified into each of the at least one general web-based category.

13. The system of claim 12, wherein the processor implemented translating module is configured for determining a set of associations between the set of general web-based categories and the set of pre-defined categories, wherein an association from the set of associations connects a general web-based category and one or more sub-categories of the general web-based category with a pre-defined category, wherein the association is determined based on a relationship between a first string pattern and a second string pattern, wherein the first string pattern corresponds to the general web-based category and the one or more sub-categories of the general web-based category and the second string pattern corresponds to the pre-defined category.

14. The system of claim 12, wherein the processor implemented translating module comprises a second percentage corresponding to the at least one content belonging to each of the at least one pre-defined category.

15. The system of claim 12, wherein the processor implemented translating module is configured for translating one or more general web-based categories to a miscellaneous category when a translation of the one or more general web-based categories to each pre-defined category in the set of pre-defined categories is absent, the miscellaneous category belonging to the set of pre-defined categories.

16. The system of claim 12, wherein the processor implemented translating module is configured for generating one or more new pre-defined categories in the set of pre-defined categories when a number of entries in a pre-defined category is more than a threshold number.

17. A computer program product comprising a computer usable medium having a computer readable program for categorizing at least one content on Internet, wherein the computer readable program when executed on a computer causes the computer to:
   gather one or more feeds associated with the at least one content, wherein the at least one content is provided by at least one content provider; extract contextual information from the one or more feeds, wherein the contextual information is embedded into the one or more feeds;
   categorize the at least one content into at least one general web-based category, the at least one general web-based category belonging to a set of general web-based categories, the computer readable program further causes the computer to:
   perform a semantic analysis of the contextual information, wherein the semantic analysis of the contextual information yields a keyword string corresponding to the contextual information; and
   classify the at least one content into the at least one general web-based category based on the keyword string;
   translate the set of general web-based categories to a set of pre-defined
   categories, wherein one or more general web-based categories from the set of general web-based categories are translated to at least one pre-defined category in the set of pre-defined categories, wherein the at least one content belongs to at least one pre-defined category when translating the set of general web-based categories to the set of pre-defined categories;
   wherein the computer readable program when executed on the computer further causes the computer to: compute a first relevance percentage corresponding to the at least one content classified into each of the at least one general web-based category; and
   compute a second relevance percentage corresponding to the at least one content belonging to each of the at least one pre-defined category.

* * * * *